(12) United States Patent
Wübbels et al.

(10) Patent No.: US 7,475,529 B2
(45) Date of Patent: Jan. 13, 2009

(54) HARVESTING APPARATUS COMPRISING A STALK CHOPPER

(75) Inventors: Richard Wübbels, Borken (DE); Josef Schulze Eissing, Legden (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 21 days.

(21) Appl. No.: 10/588,693

(22) PCT Filed: Feb. 21, 2005

(86) PCT No.: PCT/EP2005/050744

§ 371 (c)(1),
(2), (4) Date: Jun. 21, 2007

(87) PCT Pub. No.: WO2005/079555

PCT Pub. Date: Sep. 1, 2005

(65) Prior Publication Data

US 2007/0277493 A1    Dec. 6, 2007

(30) Foreign Application Priority Data

Feb. 20, 2004    (DE) .................. 10 2004 008 342

(51) Int. Cl.
*A01D 45/02* (2006.01)
(52) U.S. Cl. .............................. 56/60; 56/51
(58) Field of Classification Search .......... 56/51–53, 56/56, 60, 64, 103–112, 119, 503
See application file for complete search history.

(56) References Cited

U.S. PATENT DOCUMENTS

| 3,858,384 A | * | 1/1975 | Maiste et al. ................ 56/14.2 |
| 4,594,842 A | * | 6/1986 | Wolters et al. ................. 56/94 |
| 5,330,114 A | * | 7/1994 | Trenkamp et al. ......... 241/101.77 |

FOREIGN PATENT DOCUMENTS

| DE | 25 27 645 | 1/1976 |
| DE | 25 49 136 | 5/1977 |
| EP | 10 00 533 | 11/1999 |

OTHER PUBLICATIONS

German Search Report dated Nov. 29, 2006 (4 pages).

* cited by examiner

*Primary Examiner*—Thomas B Will
*Assistant Examiner*—Alicia Torres

(57) ABSTRACT

The invention relates to a harvesting apparatus (10), particularly a corn picker, comprising two drawing-in and picking units (18), each of which is provided with a picking gap (24) and a drawing-in device (26) that can be operated so as to draw plants into the picking gap (24) by means of which the infructescences can be separated from the plants. The inventive harvesting apparatus (10) further comprises a stalk chopper (32) that is disposed downstream of the drawing-in device (26), is used for comminuting the plant stalks, and is provided with a knife (36) which can be rotated about a shaft extending at least approximately in a vertical direction. The invention is characterized in that the envelope circle (38) described by the knife (40) of the stalk chopper spans at least the drawing-in devices (26) of two adjacent drawing-in and picking units (18).

2 Claims, 2 Drawing Sheets

HARVESTING APPARATUS COMPRISING A STALK CHOPPER

Figure 1:
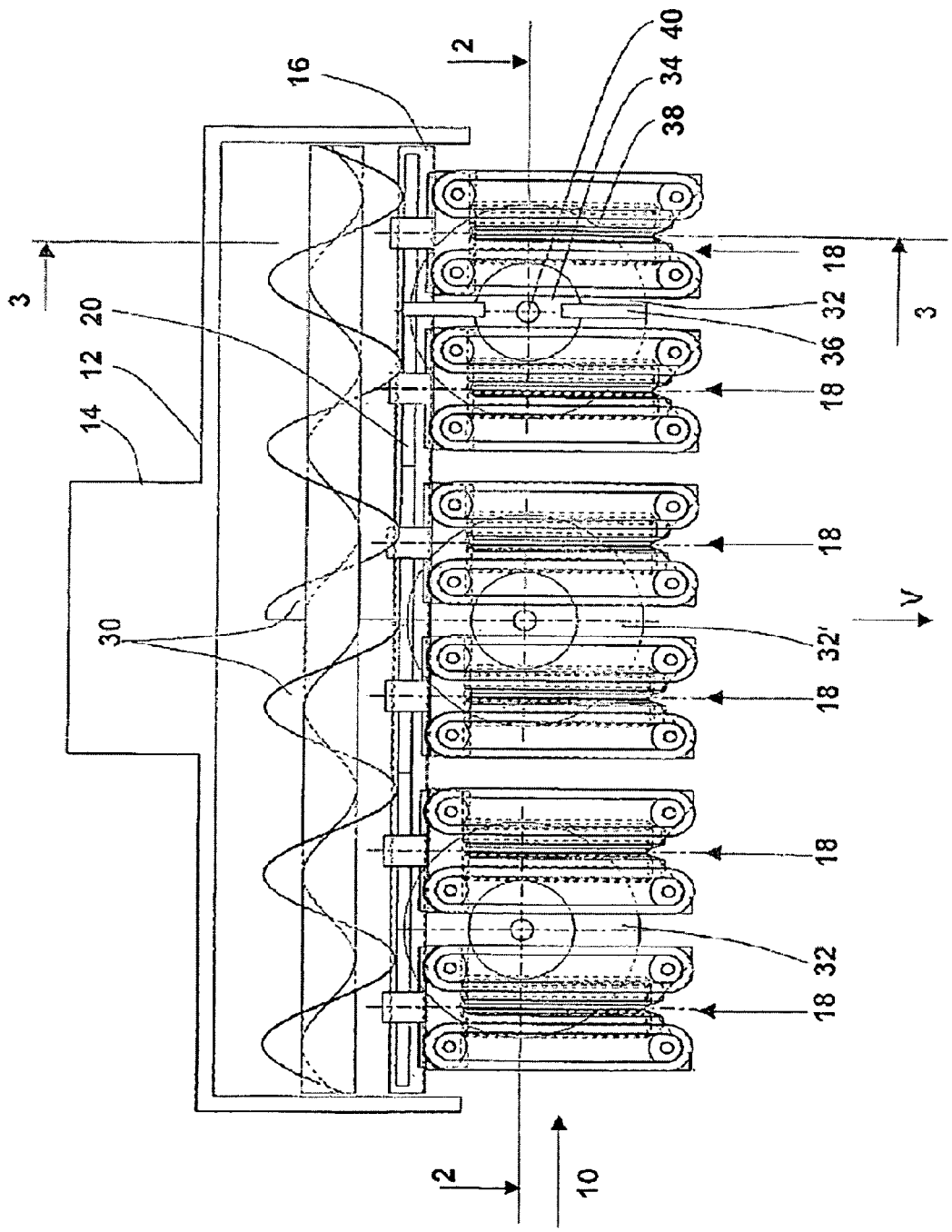

The invention pertains to a harvesting apparatus, particularly a corn picker, with at least two drawing-in and picking units that are respectively provided with a picking gap and a drawing-in device, wherein the drawing-in device can be operated so as to draw plants into the picking gap, by means of which infructescences can be separated from the plants, and with a stalk chopper that is arranged downstream of the drawing-in device and serves for comminuting the plant stalks, wherein the stalk chopper features a knife that can be set in rotation about a shaft extending at least approximately in the vertical direction.

Different types of crops, of which only the infructescences are used for additional processing, are cultivated agriculturally, for example, sunflowers, soybeans, cotton or ear corn. These types of crops are usually harvested with so-called pickers that typically feature several adjacent drawing-in and picking units in order to simultaneously harvest several rows of plants cultivated in adjacent rows. Each drawing-in and picking unit features a picking gap and a drawing-in device. The latter is typically composed of two picking rolls that are arranged on both sides and underneath the picking gap and rotate in opposite directions. The drawing-in device draws the plants downwardly into the picking gap. The dimensions of the latter are so small that it can accommodate the stalk of the plant, but not the infructescences. Consequently, the infructescences are separated from the stalk by means of the picking gap and subsequently transported to an additional processing machine, for example, in order to be threshed out in a combine harvester.

The stalks of the plants remain on the field. In order to accelerate their decomposition, it is common practice to comminute the stalks in a stalk chopper arranged downstream of the drawing-in devices. Conventional embodiments of such stalk choppers feature knives that rotate about a shaft extending approximately in the vertical direction, wherein the envelope circle of these rotating knives spans the drawing-in device. In the state of the art, it is common practice to assign a separate stalk chopper of this type to each drawing-in and picking unit; see DE 25 27 645 A or DE 25 49 136 A. The stalk chopper comminutes the stalk into small segments. In other embodiments, the picking rolls are provided with knives that comminute the stalks in the longitudinal or lateral direction.

Currently, stalk choppers with knives that rotate downstream of the drawing-in device are primarily used in Europe. In Europe, corn is typically cultivated in rows that are spaced apart by 75 cm. However, different row spacings are used in the USA, for example, 37.5 cm, 50 cm or 55 cm. Stalk choppers are currently used rather infrequently in the USA.

The increased popularity of so-called non-tillage soil cultivation, in which the field is merely cultivated after the harvest with a sowing machine that is equipped with a few soil cultivation tools, meanwhile has made the utilization of stalk choppers a sensible option for accelerating the decomposition of stalks remaining on the field in the USA as well. The customary narrower row spacing in the USA could also be utilized analogously in Europe.

Consequently, it would be desirable to arrange adjacent drawing-in and picking units so close to one another that they could also be used for harvesting crops that are cultivated in adjacent rows with a narrower spacing, for example, rows that are spaced apart by 50 cm. In order to adapt the harvesting apparatus to the row spacing of the plants to be harvested, it is common practice to arrange the drawing-in and picking units on a crossmember such that they can be horizontally displaced transverse to the forward direction.

However, if the drawing-in and picking units are equipped with a stalk chopper, it is problematic to position the drawing-in and picking units sufficiently close to one another because the stalk choppers of adjacent drawing-in and picking units would then collide with one another. Although it would be conceivable to reduce the diameter of the stalk chopper, this would lead to a deterioration of its peripheral speed, as well as to a correspondingly inferior chopping quality.

DE 20 03 964 A describes a field chopper with two adjacent drawing-in devices that are respectively realized in the form of two cooperating screw conveyors. A single disk that rotates about a vertical axis is situated underneath the rear end of the screw conveyors, wherein chopping knives are arranged on the upper side of this rotating disk and cutting knives are arranged on its circumference. The cutting knives separate the stalks of the plants from the soil while the chopping knives successively comminute the stalks. The plant segments are then fed to a conveyor in order to be deposited on a trailer. Although one chopper is assigned to two drawing-in devices in this case, a person skilled in the art would not be compelled to apply these characteristics to a picker.

The invention is based on the objective of making available a harvesting attachment with drawing-in and picking units and a stalk chopper that has a sufficiently high peripheral speed and makes it possible to realize a narrow spacing between adjacent drawing-in and picking units.

According to the invention, this objective is attained with the characteristics of claim 1, wherein characteristics for realizing advantageous additional development of the solution are disclosed in the other claim.

The invention pertains to a harvesting apparatus of the initially cited type and proposes that a single stalk chopper cooperate with two or more adjacent drawing-in and picking units. This makes it possible to eliminate the problem of possible collisions between adjacent stalk choppers when crops with a narrow row spacing are harvested. In addition, the number of knives and drive units for the stalk chopper is reduced such that the manufacturing costs and the weight of the harvesting attachment are lowered. The relatively large diameter of the envelope circle described by the knife of the stalk chopper makes it possible to achieve a relatively fast peripheral speed and therefore a quite high chopping quality.

Figure 3:
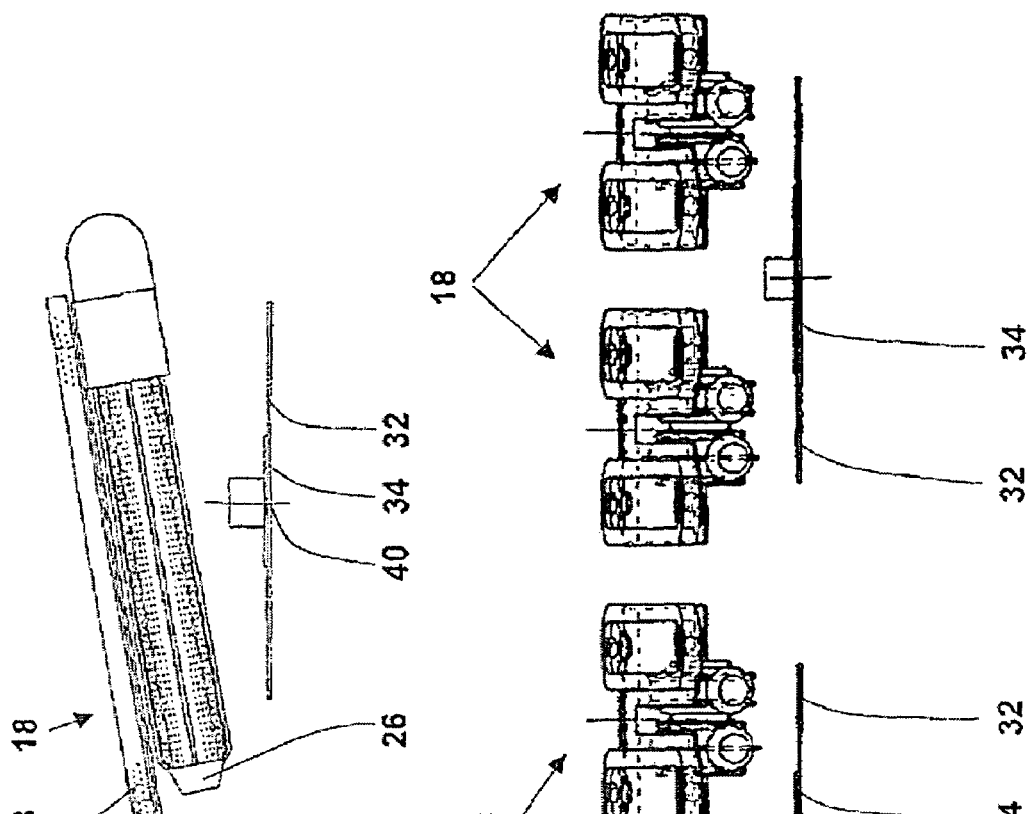
Figure 2:
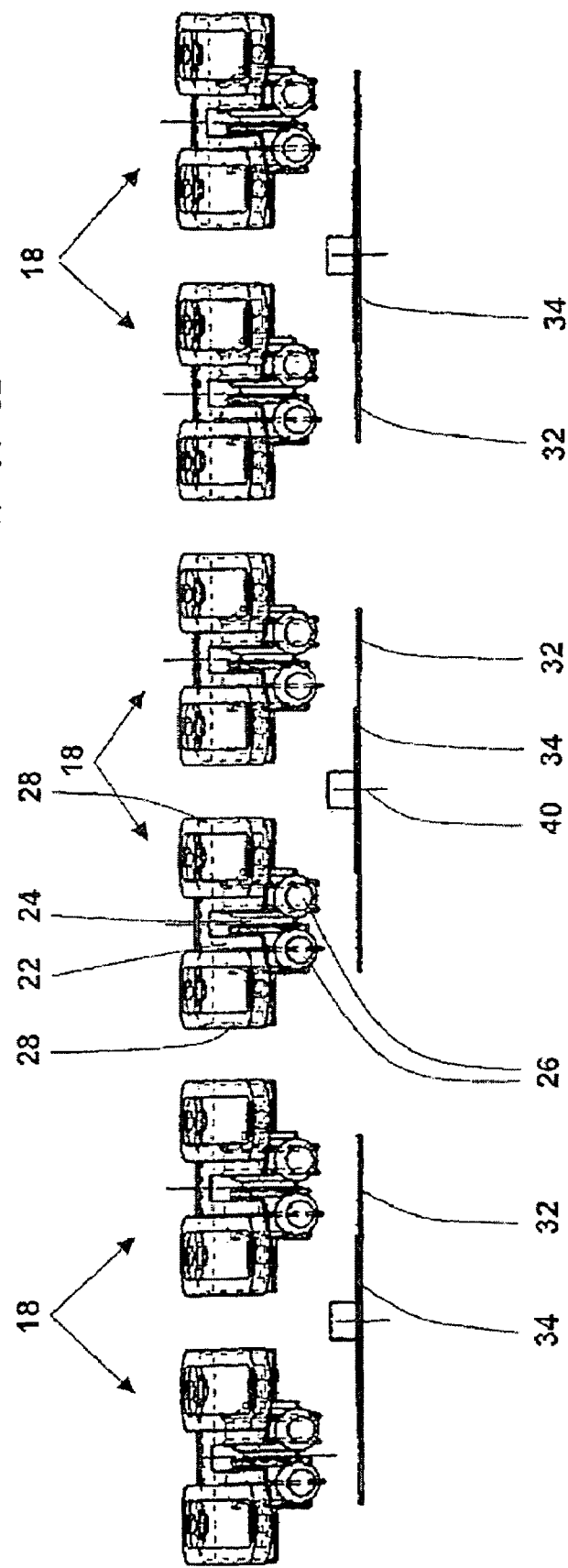

The figures show an embodiment of the invention that is described in greater detail below. The individual figures show:

FIG. 1, a top view of an inventive harvesting apparatus;

FIG. 2, a section through the harvesting apparatus according to FIG. 1 along the line 2-2, and FIG. 3, a section through the harvesting apparatus according to FIG. 1 along the line 3-3.

FIG. 1 shows a top view of an inventive harvesting apparatus 10 in the form of a harvesting attachment for a combine harvester. The harvesting apparatus 10 comprises a frame 12 that is detachably arranged on the slope conveyor 14 of the combine harvester. A crossmember 16 extends horizontally on the frame 12 transverse to the forward direction V, in which the harvesting apparatus 10 is moved over a field during the harvest. In total, six similar drawing-in and picking units 18 are mounted on the crossmember 16. Any other number of drawing-in and picking units 18 could be utilized. The drawing-in and picking units 18 are driven by a transverse shaft 20 that extends over the width of the harvesting apparatus 10 and is situated in the interior of the hollow crossmember 16. However, it could also be arranged outside the crossmember 16. The transverse shaft 20 is driven via a not-shown drive train, as is common practice with combine harvesters.

The drawing-in and picking units 18 generally have a conventional structure that is best illustrated in FIGS. 2 and 3. The drawing-in and picking units 18 respectively comprise a stripping plate 22, in which is situated a picking gap 24 that is open in the forward direction V, a drawing-in device 26 in the form of two oppositely rotating picking rolls that extend underneath the picking gap 24 in the longitudinal direction thereof, and two chain conveyors 28 that are equipped with pushers and are situated above the stripping plate 22.

During the operation, the chain conveyors 28 rearwardly draw in the stalks of the plants standing on a field between one another and transport said stalks into the picking gap 24. The stalks are taken hold of and are downwardly drawn in by the picking rolls of the drawing-in device 26 underneath the picking gap 24. The chain conveyors 28 transport the plants rearward along the picking gap 24. Infructescences such as, for example, corn ears are separated from the stalks by means of the picking gap 24 and are transported away toward the rear by the chain conveyors 28. Subsequently, they are fed to the slope conveyor 14 by a transverse screw conveyor 30. Instead of the conventional drawing-in and picking units 18 shown, it would also be possible to utilize drawing-in and picking units that draw in the stalks rotationally, e.g., as described in EP 1 305 899 A, the disclosure of which is hereby incorporated into the present application by reference.

The harvesting apparatus 10 is equipped with stalk choppers 32 in order to comminute the stalks remaining on the field and to accelerate their decomposition. The stalk choppers 32 are each composed of a disk 34 with knives 36 that are arranged thereon in a pendulum fashion and sharpened on the leading edge and preferably also the trailing edge such that they can be reversed after becoming dull. The center of the disk 34 is supported such that it can be rotatably driven about an axis 40 extending approximately in the vertical direction. It would also be conceivable to utilize any other embodiment of stalk choppers, e.g., embodiments in which knives 36 are rigidly arranged on the disk 34 or are directly arranged on a central shaft. The number of knives 36 can be chosen arbitrarily. The stalk choppers 32 are driven via (not shown) gear units that are connected to and driven by the transverse shaft 20. During the operation, the knives 36 describe envelope circles 38 that respectively span the picking gaps 24 of two adjacent drawing-in and picking units 18. Due to these measures, the stalks that emerge on the bottom between the drawing-in devices 26 of both adjacent drawing-in and picking units 18 are deposited on the field in a comminuted fashion. The manufacturing costs and the weight of the harvesting apparatus 10 are lowered because only one stalk chopper 32 is respectively required for two drawing-in and picking units 18.

Another advantage of the stalk chopper 32 can be seen in that the spacing between adjacent drawing-in and picking units 18 can be varied over a relatively broad range. The drawing-in and picking units 18 are displaceably supported on the crossmember 16 analogous to the stalk choppers 32 (preferably with the exception of the central stalk chopper 32' that is situated exactly in front of the slope conveyor 14). The stalk choppers 32 can be displaced independently of the drawing-in and picking units 18; however, it would also be conceivable to arrange one respective stalk chopper 32 on a drawing-in and picking unit 18 and to displace the stalk chopper together with this unit.

This makes it possible to position the drawing-in and picking units 18 with the stalk choppers 32 in accordance with the row spacing of the field to be harvested. The relatively large envelope circle of the knives 36 of the stalk choppers 32 makes it possible to arrange the drawing-in and picking units 18 such that they are spaced apart by a relatively long distance (even longer than shown in FIG. 1) or by a relatively short distance, while simultaneously preventing adjacent stalk choppers from colliding with one another or having to be synchronized. It is possible to realize an adjustment range that corresponds, for example, to row spacings between 37.5 and 75 cm.

The invention claimed is:

1. A harvesting apparatus (10), comprising: a corn picker, with at least two drawing-in and picking units (18) that are respectively provided with a picking gap (24) and a drawing-in device (26), wherein the drawing-in device (26) can be operated so as to draw plants into the picking gap (24), by means of which infructescences can be separated from the plants, and with a stalk chopper (32) that is arranged downstream of the drawing-in device (26) and serves for comminuting the plant stalks, wherein the stalk chopper features a knife (36) that can be set in rotation about a shaft (40) extending at least approximately in the vertical direction, characterized by the fact that an envelope circle (38) described by the knife (36) of the stalk chopper spans at least two adjacent picking gaps (24) and at least the drawing-in devices (26) of two adjacent drawing-in and picking units (18).

2. The harvesting apparatus (10) according to claim 1, characterized by the fact that the drawing-in and picking units (18) are supported in a laterally displaceable fashion on a crossmember (16), on which the stalk chopper (32) is also supported.

* * * * *